United States Patent
Cheng et al.

(10) Patent No.: US 11,201,327 B2
(45) Date of Patent: Dec. 14, 2021

(54) LITHIUM ION SECONDARY BATTERY

(71) Applicant: NEC Corporation, Tokyo (JP)

(72) Inventors: Qian Cheng, Tokyo (JP); Katsumi Maeda, Tokyo (JP); Noriyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 437 days.

(21) Appl. No.: 16/306,366

(22) PCT Filed: Jun. 13, 2017

(86) PCT No.: PCT/JP2017/021810
§ 371 (c)(1),
(2) Date: Nov. 30, 2018

(87) PCT Pub. No.: WO2017/217408
PCT Pub. Date: Dec. 21, 2017

(65) Prior Publication Data
US 2021/0226207 A1    Jul. 22, 2021

(30) Foreign Application Priority Data
Jun. 13, 2016    (JP) .............................. JP2016-117205

(51) Int. Cl.
*H01M 4/525*    (2010.01)
*H01M 4/36*    (2006.01)
(Continued)

(52) U.S. Cl.
CPC ........... *H01M 4/525* (2013.01); *H01M 4/366* (2013.01); *H01M 4/505* (2013.01); *H01M 4/62* (2013.01);
(Continued)

(58) Field of Classification Search
None
See application file for complete search history.

(56) References Cited

U.S. PATENT DOCUMENTS

| 2004/0106047 A1* | 6/2004 | Mie | H01M 10/0567 |
| | | | 429/324 |
| 2008/0096110 A1* | 4/2008 | Bito | H01M 4/131 |
| | | | 429/220 |

(Continued)

FOREIGN PATENT DOCUMENTS

| JP | 2009-187698 A | 8/2009 |
| JP | 2014-013704 A | 1/2014 |

(Continued)

OTHER PUBLICATIONS

Fan et al., Carbon, 60 (2013), 538-561. (Year: 2013).*
(Continued)

*Primary Examiner* — Eli S Mekhlin

(57) ABSTRACT

In order to provide a lithium ion secondary battery having both high energy density and an excellent charge-rate characteristic, there is provided a lithium ion secondary battery including a positive electrode containing a positive electrode active material made of a lithium composite oxide, and nano-carbon having a Li ion diffusion path as an additive, and an electrolyte solution containing 0.5 mol/l or more of $Li[(FSO_2)_2N]$ as an electrolyte, $LiPO_2F_2$ as an additive, and a ternary-system of ethylene carbonate (EC), dimethyl carbonate (DMC) and ethyl methyl carbonate (EMC), as solvents.

9 Claims, 3 Drawing Sheets

(51) Int. Cl.
- *H01M 4/505* (2010.01)
- *H01M 4/62* (2006.01)
- *H01M 10/0525* (2010.01)
- *H01M 10/0567* (2010.01)
- *H01M 10/0568* (2010.01)
- *H01M 10/0569* (2010.01)
- *H01M 4/02* (2006.01)

(52) U.S. Cl.
CPC ... *H01M 10/0525* (2013.01); *H01M 10/0567* (2013.01); *H01M 10/0568* (2013.01); *H01M 10/0569* (2013.01); H01M 2004/021 (2013.01); H01M 2004/028 (2013.01); H01M 2300/004 (2013.01)

(56) References Cited

U.S. PATENT DOCUMENTS

| | | | | |
|---|---|---|---|---|
| 2011/0159363 | A1* | 6/2011 | Tanaka | H01M 4/621 429/217 |
| 2013/0330610 | A1* | 12/2013 | Shigematsu | H01M 10/0567 429/200 |
| 2616/0268636 | | 9/2016 | Cha et al. | |
| 2018/0114651 | A1* | 4/2018 | Shimamoto | H01M 10/052 |
| 2019/0044182 | A1 | 2/2019 | Maeda et al. | |

FOREIGN PATENT DOCUMENTS

| | | |
|---|---|---|
| JP | 2014-035922 A | 2/2014 |
| JP | 5822044 B | 11/2015 |
| WO | WO 2015/046475 A1 | 4/2015 |
| WO | WO 2015/170785 A2 | 11/2015 |
| WO | 2017/047280 A1 | 3/2017 |

OTHER PUBLICATIONS

International Search Report dated Aug. 29, 2017, in corresponding PCT International Application.

Japanese Office Action for JP Application No. 2018-523930 dated Jun. 15, 2021 with English Translation.

* cited by examiner (a)

(b)

(a)

(b)

(a)

(b)

LITHIUM ION SECONDARY BATTERY

CROSS-REFERENCE TO RELATED PATENT APPLICATIONS

This application is a National Stage Entry of International Application No. PCT/JP2017/021810, filed Jun. 13, 2017, which claims priority from Japanese Patent Application No. 2016-117205, filed Jun. 13, 2016. The entire contents of the above-referenced applications are expressly incorporated herein by reference.

TECHNICAL FIELD

The present invention relates to a lithium ion secondary battery.

BACKGROUND ART

A high energy-density and quickly chargeable lithium ion battery is important for electric vehicles and plug-in hybrid vehicles.

Patent Literature 1 proposes addition of a solubilization aid for improving solubility of lithium difluorophosphate ($LiPO_2F_2$), when $LiPO_2F_2$ is added in non-aqueous electrolyte solution for improving high temperature storability and cycle characteristics, in order to further improve output characteristics. However, relevancy to an electrode structure is not particularly described.

Patent Literature 2 proposes an electrolyte solution containing a solvent linear carbonate-containing and a compound having a sulfonic acid ester and/or a sulfone compound as an additive agent, in order to provide a non-aqueous electrolyte solution for lithium secondary battery, expected to be stably operated without almost no corrosion of a current collector, even if a cell employing a high-concentration imide based alkali metal salt such as $Li[(FSO_2)_2N]$ as an electrolyte is operated under the condition of 4 V or more, and a lithium secondary battery comprising the same. However, relevancy to an electrode structure is not particularly described.

CITATION LIST

Patent Literatures

Patent Literature 1: JP 5822044B
Patent Literature 2: JP 2014-13704A

SUMMARY OF INVENTION

Technical Problem

As a positive electrode material that can be put to practical use at present, lithium composite oxides having such as a layered compound and a spinel structure and a lithium iron phosphate having an olivine structure are known.

However, weight and volume energy densities require not only electrode density but also higher mass load on a negative electrode and a positive electrode. An electrode having high compression and high mass load has a problem in dispersibility of an electrolyte particularly at a high rate.

Even if the electrolyte solution described in Patent Literature 1 or 2 is used, it has been impossible to provide a secondary battery having high energy density and excellent charge characteristics at a high rate suitable for quick charging.

An object of the present invention is to provide a lithium ion secondary battery having both high energy density and an excellent charge-rate characteristic.

Solution to Problem

According to one aspect, there is provided a lithium ion secondary battery including a positive electrode containing a positive electrode active material made of a lithium composite oxide, and nano-carbon having a Li ion diffusion path as an additive, and an electrolyte solution containing 0.5 mol/l or more of $Li[(FSO_2)_2N]$ as an electrolyte, $LiPO_2F_2$ as an additive, and a ternary-system of ethylene carbonate (EC), dimethyl carbonate (DMC) and ethyl methyl carbonate (EMC), as solvents.

In particular, it is preferable that the nano-carbon coats the surface of a positive electrode active material in the positive electrode; and that the nano-carbon is at least one selected from porous graphene and carbon nanotube.

Advantageous Effects of Invention

According to one aspect, a lithium ion secondary battery having both high energy density and an excellent charge-rate characteristic can be provided.

DESCRIPTION OF EMBODIMENTS

Figure 1:
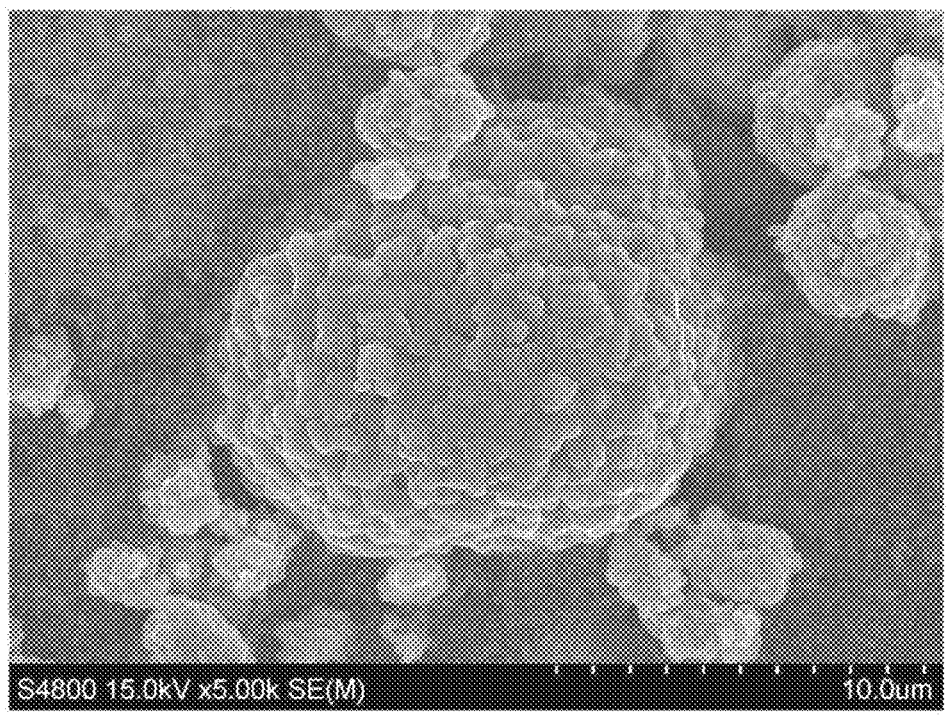
FIG. 1 shows SEM images of the surface of a positive electrode formed without adding nano-carbon.
Figure 1:
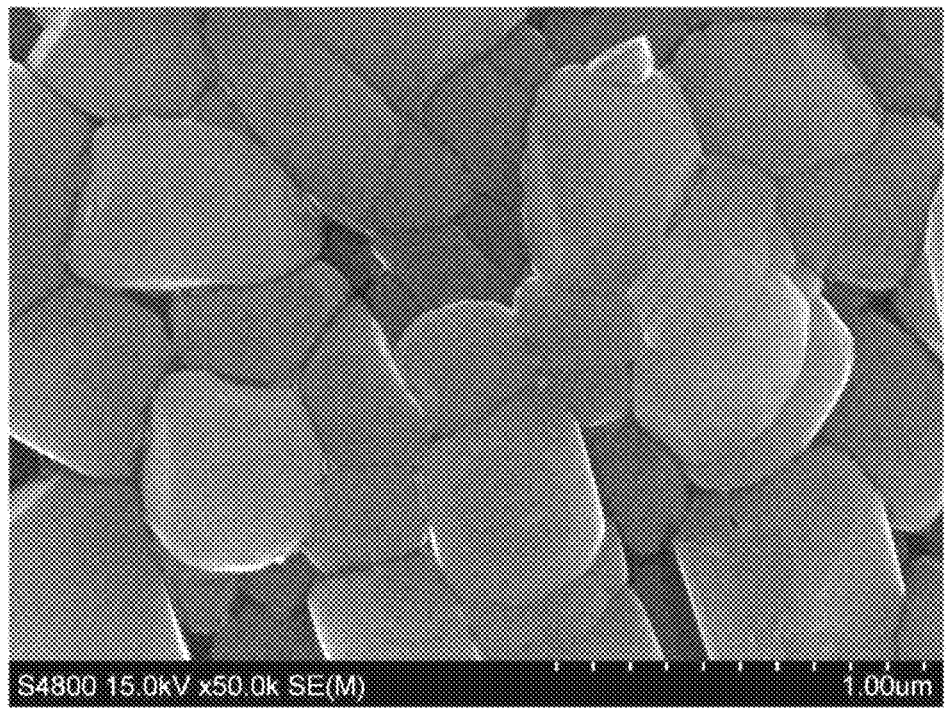

The electrolyte solution of the present invention contains a 0.5 mold or more of $Li[(FSO_2)_2N]$ (hereinafter referred to as LiFSI) as an electrolyte, $LiPO_2F_2$ as an additive agent, and a ternary-system of ethylene carbonate (EC), dimethyl carbonate (DMC) and ethyl methyl carbonate (EMC) as solvents.

LiFSI has a low lithium ion solvation in a nonaqueous solvent, particularly in a ternary-system of solvents as mentioned above, compared to LIP& usually used as an electrolyte for lithium ion secondary batteries. Because of this, the activation energy of LiFSI for desolvation during a charge/discharge process is low and thus, intercalation and deintercalation of lithium ions can be more quickly performed.

$LiPO_2F_2$ used as an additive, if it is added in the electrolyte solution to form a thin coating film on the surface of a positive electrode, is expected to permit more rapid charge/discharge. However, a positive electrode material used as an active material is basically low in electron conductivity, and thus, the coating film of $LiPO_2F_2$ tends to be rarely formed uniformly on the surface of the positive electrode by initial charge/discharge. Then, in the present invention, nano-carbon having a lithium ion path such as pores is added to a positive-electrode slurry to cover the surface of the positive electrode material, thereby enhancing electron conductivity. Since nano-carbon has a lithium ion path, intercalation/deintercalation of lithium ions at the positive electrode material is not inhibited. A coating film of $LiPO_2F_2$ can be uniformly formed over the nano-carbon on the surface of the positive electrode material by the charge/discharge later performed. As a result, charge/discharge of the lithium ion secondary battery can be more quickly performed as a whole.

Now, constitutions of the lithium ion secondary battery according to the present invention will be individually described below.

(Positive Electrode)

The positive electrode of the lithium ion secondary battery according to the present invention contains a positive electrode active material and nano-carbon.

The positive electrode active material is not particularly limited, and a lithium composite oxide, lithium iron phosphate and the like can be used. Examples of the lithium composite oxide include lithium manganate ($LiMn_2O_4$, $Li_2MnO_3$); lithium cobaltate ($LiCoO_2$); lithium nickelate ($LiNiO_2$); compounds obtained by substituting at least part of the moieties of manganese, cobalt and nickel of these lithium compounds with other metal elements such as aluminum, magnesium, titanium and zinc; nickel-substituted lithium manganate obtained by substituting part of the manganese moiety of lithium manganate with at least nickel; cobalt-substituted lithium nickelate obtained by substituting part of nickel moiety of lithium nickelate with at least cobalt; a compound obtained by substituting part of the manganese moiety of nickel-substituted lithium manganate with other metal (at least one of, for example, aluminum, magnesium, titanium and zinc); and a compound obtained by substituting part of the nickel moiety of cobalt-substituted lithium nickelate with other metal element (at least one of, for example, aluminum, magnesium, titanium and zinc). These lithium composite oxides can be used alone or as a mixture of two or more.

In particular, in the present invention, a lithium composite oxide having a layered structure can be preferably used. Examples of the lithium composite oxide having a layered structure include $LiCo_{0.8}Ni_{0.2}O_2$, $LiNi_{1/3}Co_{1/3}Mn_{1/3}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.8}Co_{0.1}Mn_{0.1}O_2$, $LiNi_{0.8}Co_{0.15}Al_{0.05}O_2$, $Li_{1.2}Mn_{0.4}Ni_{0.4}O_2$, $Li_{1.2}Mn_{0.6}Ni_{0.2}O_2$, $Li_{1.2}Mn_{0.56}Ni_{0.17}Co_{0.07}O_2$, $Li_{1.2}Mn_{0.54}Ni_{0.13}Co_{0.13}O_2$, $Li_{1.2}Mn_{0.56}Ni_{0.17}Co_{0.07}O_2$, $Li_{1.2}Mn_{0.54}Ni_{0.13}Co_{0.13}O_2$, $LiNi_{0.8}Co_{0.15}Al_{0.05}O_2$, $LiNi_{0.5}Mn_{1.48}Al_{0.02}O_4$, $LiNi_{0.4}Co_{0.2}Mn_{1.25}Ti_{0.15}O_4$, $Li_{1.2}Ni_{0.18}Mn_{0.54}Co_{0.08}O_2$.

With respect to the average particle size of the positive electrode active material, in view of reactivity with an electrolyte solution, a rate characteristic and the like, a positive electrode active material having an average particle size within the range of, for example, 0.1 to 50 μm, preferably the range of 1 to 30 μm, and more preferably the range of 5 to 25 μm, can be used. The average particle size herein refers to a particle size (median diameter: D50) at an integrated value of 50% in the particle size distribution (on the basis of volume) obtained by a laser diffraction scattering method.

As the nano-carbon, a material having pores (holes) and pipes (cylinders or tubes) serving as a lithium ion path can be used. For example, graphene (hereinafter referred to as porous graphene) having many pores in the basal plane, carbon nanotube, and carbon nanohorn (aggregates) having opening can be mentioned. Of them, porous graphene and carbon nanotube are preferable. These can be used singly or in combinations of two or more.

It is more preferable that the porous graphene satisfies the following conditions (1) to (6):

(1) The porous graphene has 1 to 200 graphene layers,
(2) The sizes of pores in a graphene basal plane range from 70 nm to 200 nm,
(3) The number of pores in each graphene basal plane is 10 to 500 per $\mu m^2$,
(4) Oxygen content is 0.8 mass % or less,
(5) In Raman spectroscopy, the peak intensity-ratio $I_D/I_G$, which is the ratio of the peak in G band present within the range of 1596 to 1570 $cm^{-1}$ to the peak in D band near 1360 $cm^{-1}$, is 0.6 to 1.35,
(6) Pore volumes fall within the range of 1.35 to 3 $cm^3/g$.

The porous graphene as mentioned above can be obtained by preparing a graphene foil consisting of about 1 to 200 layers by applying e.g., thermal shock or mechanical shock to starting graphite (e.g., graphite oxide and expandable graphite having an expandable substance introduced between layers) or a graphene oxide, and subjecting the graphene foil to an oxidation treatment to form many pores in the graphene basal planes. The porous graphene thus obtained is further subjected to a reduction treatment to reduce the oxygen content to obtain desired porous graphene.

More specifically, the starting substance is heated in the air from room temperature to a temperature of 250° C. or more at a raising rate of 10° C./minute or more to give thermal shock. In this manner, the starting substance is expanded to a graphene-like structure, which is further heated in the air at a temperature within the range of 350° C. to 850° C. to form a functional group(s). Thereafter, the atmosphere used in the heat treatment is changed to nitrogen atmosphere and the resultant material is further heated for 2 to 24 hours to obtain porous graphene having pores in the graphene basal planes.

It is preferable that the carbon nanotube satisfies the following conditions (1) and (2):

(1) Length is 5 nm to 50 μm,
(2) Diameter is 1.2 nm to 100 nm.

When carbon nanotube is used, a surfactant is preferably used in order to improve dispersibility. As the surfactant, e.g., octylphenol ethoxylate (trade name, Triton X-100, manufactured by Dow Chemical Company), sodium lauryl sulfate (sodium dodecyl sulfate: SDS) and polyvinylpyrrolidone (PVP) can be used. Carbon nanotube is preferably used by dispersing it in water containing a surfactant in an amount of 1 to 8 mass % at the time of preparation of a slurry (later described). By improving the dispersibility in this way, network of carbon nanotube can be uniformly formed on the surface of a positive electrode active material.

The positive electrode can be produced by forming a positive electrode active material layer on a positive electrode current collector for example, by preparing a slurry containing e.g., a positive electrode active material, nano-carbon, a binder and a solvent, and a conductive aid such as carbon black as necessary, applying the slurry onto a positive electrode current collector, drying and, if necessary, applying pressure. Similarly to a negative electrode, the positive electrode active material layer is formed, and thereafter, a thin film serving as a current collector may be formed.

In preparing the slurry, nano-carbon adsorbs to the surface of the positive electrode active material. In the obtained positive electrode, nano-carbon is present just like the positive electrode active material is coated with the nano-carbon. The nano-carbon present on the surface of the positive electrode active material in this manner improves the electron conductivity of the positive electrode active material and synergistically acts with the electrolyte solution according to the present invention to successfully provide a secondary battery excellent in a capacity maintenance characteristic at a high rate.

Examples of the binder for a positive electrode include, but are not particularly limited to, polyvinylidene fluoride (PVdF), a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide, and polyamide imide. Of them, in view of versatility and low cost, polyvinylidene fluoride is preferable. The content of the binder for a positive electrode, in view of binding strength and energy density having a tradeoff relationship, preferably falls within the range of 1 to 25 parts by mass, more preferably the range of 2 to 20 parts by mass and further preferably, the range of 2 to 10 parts by mass relative to 100 parts by mass of the positive electrode active material. As a slurry solvent, N-methyl-2-pyrrolidone (NW) can be used.

(Electrolyte Solution)

As the electrolyte solution, a non-aqueous electrolyte solution can be used, which is prepared by dissolving a lithium salt in a nonaqueous solvent. Examples of the nonaqueous solvent include a ternary-system of solvents containing ethylene carbonate (EC), dimethyl carbonate (DMC) and ethyl methyl carbonate (EMC). Other nonaqueous solvents known in the art can be used in combination as long as the effects of the invention are not undermined. Examples thereof include cyclic carbonates such as propylene carbonate (PC), butylene carbonate (BC) and vinylene carbonate (VC); linear carbonates such as diethyl carbonate (DEC) and dipropyl carbonate (DPC); aliphatic carboxylic acid esters such as methyl formate, methyl acetate and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyl tetrahydrofuran. As the other nonaqueous solvents, an aprotic organic solvent, such as dimethylsulfoxide, 1,3-dioxolane, a dioxolane derivative, formamide, acetamide, dimethylformamide, acetonitrile, propionitrile, nitromethane, ethyl monoglyme, phosphoric acid triester, trimethoxymethane, sulfolane, methyl sulfolane, 1,3-dimethyl-2-imidazolidinone, 3-methyl-2-oxazolidinone, a propylene carbonate derivative, a tetrahydrofuran derivative, ethyl ether, 1,3-propane sultone, anisole and N-methyl pyrrolidone, can be used in combination with a ternary-system of solvents as mentioned above.

It is preferable that the ternary-system of solvents in combination are contained in a volume ratio represented by the following expression (1):

$$EC/DMC/EMC = x:y:1-x-y \quad (1)$$

wherein x is 0.15 to 0.5; y is 0.2 to 0.6; and x+y<1.

Examples of the lithium salt include LiFSI and other lithium salt may be further mixed and used. LiFSI, if used alone, erodes an Al foil used in a positive electrode current collector and cycle characteristics may deteriorate. If the lithium salt is used in combination with the other lithium salt, corrosion of the Al foil in a charge/discharge process can be effectively suppressed. As the other lithium salt, electrolyte materials usually used, such as $LiPF_6$, $LiClO_4$, $LiBF_4$, $LiCF_3SO_3$, $LiN(CF_3SO_2)_2$ (hereinafter "LiTFSI"), $LiN(C_2F_5SO_2)_2$ (hereinafter "LiBETI"), $Li(CF_3SO_2)_3C$ and $Li(C_2F_5SO_2)_3C$ can be used. Particularly, $LiPF_6$ is preferably used in combination.

The concentration of LiFSI in the electrolyte solution is 0.5 mol/L or more. The molar ratio of LiFSI to the other electrolyte is preferably 1 or more. The total concentration of lithium salts is preferably 0.6 mol/L to 2 mol/L, and more preferably 1 mol/L to 1.5 mol/L, in view of solubility and ion conductivity.

Further, according to the present invention, the electrolyte solution contains $LiPO_2F_2$ as an additive. The amount of $LiPO_2F_2$ added in the electrolyte solution is preferably 0.005 to 7 mass % and more preferably 0.5 to 5 mass %.

(Negative Electrode)

As the negative electrode active material, a material capable of reversibly absorbing/desorbing lithium ions (a material which can intercalate lithium ions at the charging and deintercalate lithium ions at the discharging) can be used. As the negative electrode active material, a metal oxide and a carbon material such as graphite and soft carbon or the like can be used. Of them, a graphite-based negative electrode active material is preferably used in order to provide a high-power secondary battery. Examples of the forms of these materials include, but are not particularly limited to, thin film form, agglomerated powder, fiber-like form and flake-like form. These negative electrode active materials can be used alone or in combination.

When graphite is used as the negative electrode active material, graphite can be coated with amorphous carbon in order to suppress reaction with an electrolyte solution.

The average particle size of the graphite-based active material is preferably 1 μm or more and 30 μm or less, more preferably 20 μm or less and further preferably 16 μm or less. The average particle size herein refers to a particle size (median diameter: $D_{50}$) at an integrated value of 50% in the particle size distribution (on the basis of volume) obtained by a laser diffraction scattering method.

A negative electrode of a lithium ion secondary battery can be produced, for example, by forming a negative electrode active material layer containing a negative electrode active material and a binder, on a negative electrode current collector. The negative electrode active material layer can be formed by a slurry application method usually used. More specifically, the negative electrode is obtained by preparing a slurry containing a negative electrode active material, a binder and a solvent, applying the slurry onto a negative electrode current collector, drying and, if necessary, applying pressure. Examples of a method for applying the negative electrode slurry include a doctor blade method, a die-coater method and a dip-coating method. Alternatively, the negative electrode can be obtained by forming a negative electrode active material layer in advance and then forming a metal thin film by a vapor deposition method, a sputtering method or the like, as a current collector.

The binder for a negative electrode is not particularly limited, and examples thereof include polyvinylidene fluoride (PVdF), a vinylidene fluoride-hexafluoro propylene copolymer, a vinylidene fluoride-tetrafluoroethylene copolymer, a styrene-butadiene copolymer rubber (SBR), polytetrafluoroethylene, polypropylene, polyethylene, polyimide, polyamide imide, methyl (meth)acrylate, ethyl (meth)acrylate, butyl (meth)acrylate, (meth)acrylonitrile, isoprene rubber, butadiene rubber and fluorine rubber. As a slurry solvent, N-methyl-2-pyrrolidone (NMP) and water can be used. When water is used as the solvent, carboxymethyl cellulose (CMC), methyl cellulose, hydroxymethyl cellulose, ethyl cellulose and polyvinyl alcohol can be further used as a thickener.

The content of the binder for the negative electrode, in view of binding strength and energy density having a tradeoff relationship, preferably falls within the range of 0.1 to 30 parts by mass, more preferably the range of 0.5 to 25 parts by mass and further preferably, the range of 1 to 20 parts by mass relative to 100 parts by mass of the negative electrode active material.

The negative electrode current collector is not particularly limited, and copper, nickel, stainless, molybdenum, tungsten, tantalum and an alloy containing two or more of these are preferable in consideration of electrochemical stability. Examples of the shape thereof include foil, flat plate and mesh.

(Separator)

The separator can be provided between the positive electrode and the negative electrode. As the separator, a porous film and woven fabric and non-woven fabric made of a polyolefin such as polypropylene and polyethylene; a fluororesin such as polyvinylidene fluoride; or polyimide or the like can be used.

(Battery)

Examples of the form of the battery include cylindrical, square, coin, button and laminate forms. In the case of laminate form, a laminate film is preferably used as a jacket housing a positive electrode, a separator, a negative electrode and an electrolyte solution. The laminate film contains a resin substrate, a metal foil layer and a heat sealing layer (sealant). As the resin substrate, polyester and nylon are mentioned. As the metal foil layer, aluminum, an aluminum alloy and titanium foil are mentioned. As the material for the heat sealing layer, thermoplastic polymer materials such as polyethylene, polypropylene and polyethylene terephthalate are mentioned. The resin substrate layer and metal foil layer each are not limited to a single layer and may be constituted of two or more layers. In view of versatility and cost, an aluminum laminate film is preferable.

The positive electrode, negative electrode and separator arranged between them are housed in an outer container formed of a laminate film or the like, and the electrolyte solution is poured and the container is sealed. Alternatively, a structure where electrode groups having multiple pairs of electrodes stacked are housed can be used.

EXAMPLES

Now, the present invention will be specifically described with reference to Examples; however, the present invention is not limited only to these Examples.

Production Example 1 (Production of Porous Graphene)

First, natural graphite and $NaNO_3$ were mixed in a flask. Then, 100 ml of $H_2SO_4$ (95%) was added while stirring the mixture in an ice bath. Potassium permanganate (8 g) was gradually added while avoiding overheating. The resultant suspension was stirred at room temperature for two hours. The color of the suspension was light brown. Then, distilled water (90 ml) was added in the flask while stirring. The temperature of the suspension immediately reached 90° C. and the color of the suspension changed to yellow. The suspension diluted in this manner was further stirred at 98° C. for 12 hours. To the suspension, 30 ml of 30% $H_2O_2$ was added and the liquid medium thereof was replaced with 5% HCl. Subsequently, the suspension was washed several times with deionized water. Thereafter, the suspension was centrifuged at 4000 rpm for 6 minutes. After filtration and vacuum dry, oxidized graphite was obtained as a black powder. The oxidized graphite synthesized in this manner was subjected to thermal shock performed at 400° C. for 20 minutes in a $N_2$ atmosphere. Subsequently, the surface of the sample was gently oxidized at 500° C. for 30 minutes in dry air to obtain a porous graphene precursor. The precursor thus obtained was heated in a $N_2$ atmosphere at 5° C./minute up to 1000° C. and reduced while keeping the same temperature for 6 hours to obtain porous graphene. The porous graphene obtained had the following physical properties.

(1) The number of graphene layers (average): 5 layers (2) Size of pores: 50 nm (3) The number of pores: 12 pores/$\mu m^2$, (4) Oxygen content: 0.5 mass %

(5) $I_D/I_G$: 0.8, (6) Pore volume: 3.6 $cm^3/g$ (7) Specific surface area: 1051 $m^2/g$ Production Example 2 (Production of Negative Electrode)

Spherical natural graphite (specific surface area 5 $m^2/g$) having an average particle size of 15 μm was used as a negative electrode active material. The active material, carboxymethyl cellulose (CMC), a styrene-butadiene copolymer (SBR) and carbon black were mixed in a mass ratio of 96:2:1:1 and dispersed in a solvent mixture of water and NMP to prepare a negative electrode slurry. The negative electrode slurry was applied to a Cu foil of 20 μm in thickness serving as a negative electrode current collector so as to obtain a mass load of 45 $g/m^2$, dried and compressed to obtain a negative electrode. The density of the negative electrode active material layer was controlled to be 1.4 $g/cm^3$.

Comparative Example 1

$LiNi_{1/3}Co_{1/3}Mn_{1/3}O_2$ (abbreviation: NMC111) having an average particle size of 10 μm, PVdF and carbon black were mixed in a mass ratio of 89:4:7 and dispersed in NMP to prepare a positive electrode slurry. The positive electrode slurry was applied to an Al foil of 15 μm in thickness so as to be a mass load of 120 $g/m^2$, dried and compressed to obtain a positive electrode. The density of the positive electrode active material layer was controlled to be 2.8 $g/cm^3$. SEM images of the surface of the positive electrode are shown in FIG. 1. Note that, FIGS. 1 (*a*) and (*b*) have different magnitudes. The same applies to FIG. 2 to FIG. 3.

$LiPF_6$ was dissolved in a solvent mixture containing ethylene carbonate (EC) and diethyl carbonate (DEC) in a ratio of 3/7 so as to be a concentration of 1 mol/l to obtain an electrolyte solution.

The positive electrode obtained above and the negative electrode obtained in Production Example 2 were layered with a porous polypropylene separator interposed between them such that the active material surfaces face each other to form an electrode element, which was enclosed together with an electrolyte solution in an outer container formed of an aluminum laminate film, to prepare a test cell.

Comparative Example 2

A test cell was prepared in the same manner as in Comparative Example 1 except that an electrolyte solution, which was prepared by dissolving 0.65 mold LiFSI and 0.65 mol/l $LiPF_6$ in a ternary-system of solvents containing EC, dimethyl carbonate (DMC) and ethyl methyl carbonate (EMC) (EC/DMC/EMC=2/4/4 (volume ratio)), was used.

Comparative Example 3

A test cell was prepared in the same manner as in Comparative Example 2 except that 1 mass % of $LiPO_2F_2$ was added in an electrolyte solution.

Comparative Example 4

A slurry containing NCM111, PVdF, carbon black and vapor-grown carbon fiber "VGCF" (registered trade mark, manufactured by SHOWA DENKO K. K.) in a mass ratio of 86:4:7:3 was prepared and applied to an Al foil of 15 μm in thickness so as to be a mass load of 123.6 g/m², to obtain a positive electrode. The density of the positive electrode active material layer was controlled to be 2.8 g/cm³.

A test cell was prepared in the same manner as in Comparative Example 3 except that the positive electrode obtained above was used.

Example 1

A slurry containing NCM111, PVdF, carbon black and porous graphene (simply referred to as PG) of Production Example 1 in a mass ratio of 88.5:4:7:0.5 was prepared and applied to an Al foil of 15 μm in thickness so as to be a mass load of 121 g/m², to obtain a positive electrode. The density of the positive electrode active material layer was controlled to be 2.8 g/cm³.

Figure 2:
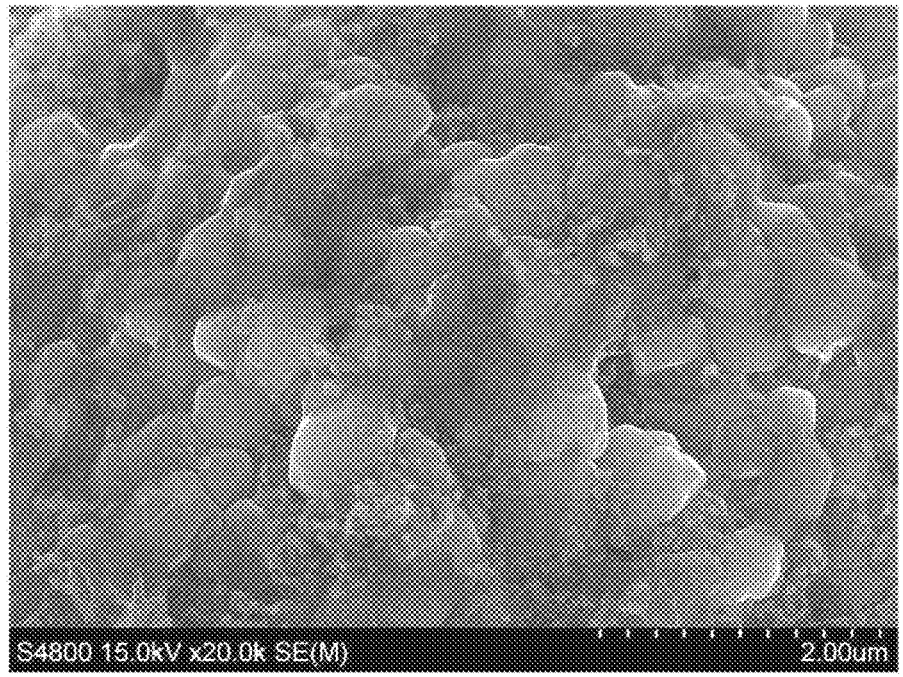
FIG. 2 shows SEM images of the surface of a positive electrode formed by adding porous graphene.
Figure 2:
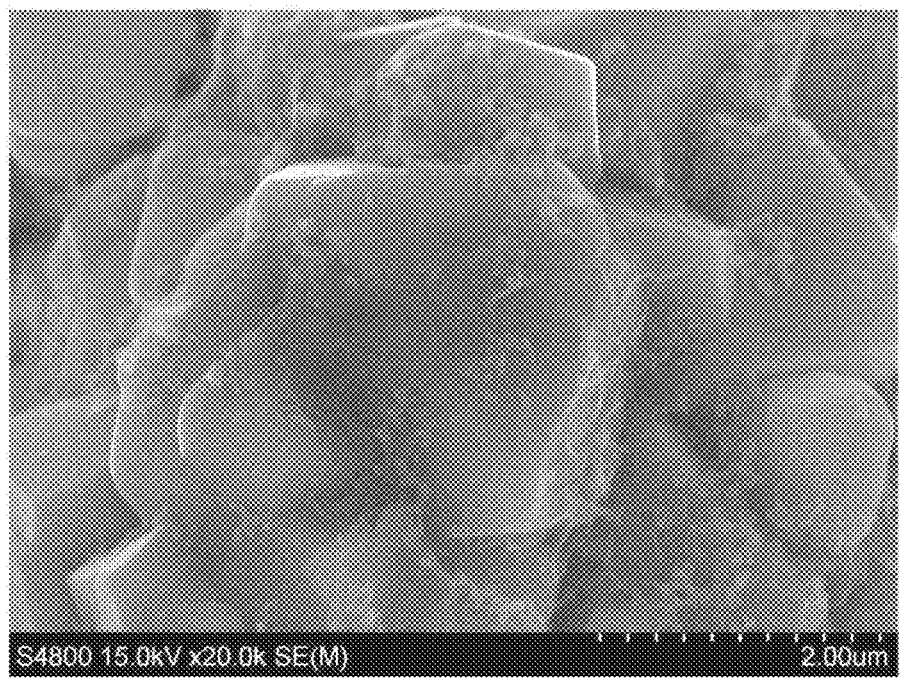

A test cell was prepared in the same manner as in Comparative Example 3 except that the positive electrode obtained above was used. The SEM images of the surface of the positive electrode are shown in FIG. 2.

Example 2

A slurry containing NCM111, PVdF, carbon black and PG of Production Example 1 in a mass ratio of 86:4:7:3 was prepared and applied to an Al foil of 15 μm in thickness so as to be a mass load of 123.6 g/m², to obtain a positive electrode. The density of the positive electrode active material layer was controlled to be 2.8 g/cm³.

A test cell was prepared in the same manner as in Comparative Example 3 except that the positive electrode obtained above was used.

Example 3

A slurry containing NCM111, PVdF, carbon black and carbon nanotube (simply referred to as CNT, average diameter: 10 nm, specific surface area: 200 m²/g, length: 500 nm) in a mass ratio of 86:4:7:3 was prepared and applied to an Al foil of 15 μm in thickness so as to be a mass load of 123.6 g/m², to obtain a positive electrode. The density of the positive electrode active material layer was controlled to be 2.8 g/cm³. Note that, CNT was prepared as a dispersion solution such that CNT was dispersed so as to obtain a concentration of 5.9 mass % in a NMP solvent, to which 5 mass % polyvinylpyrrolidone was added, mixed in a slurry and used.

Figure 3:
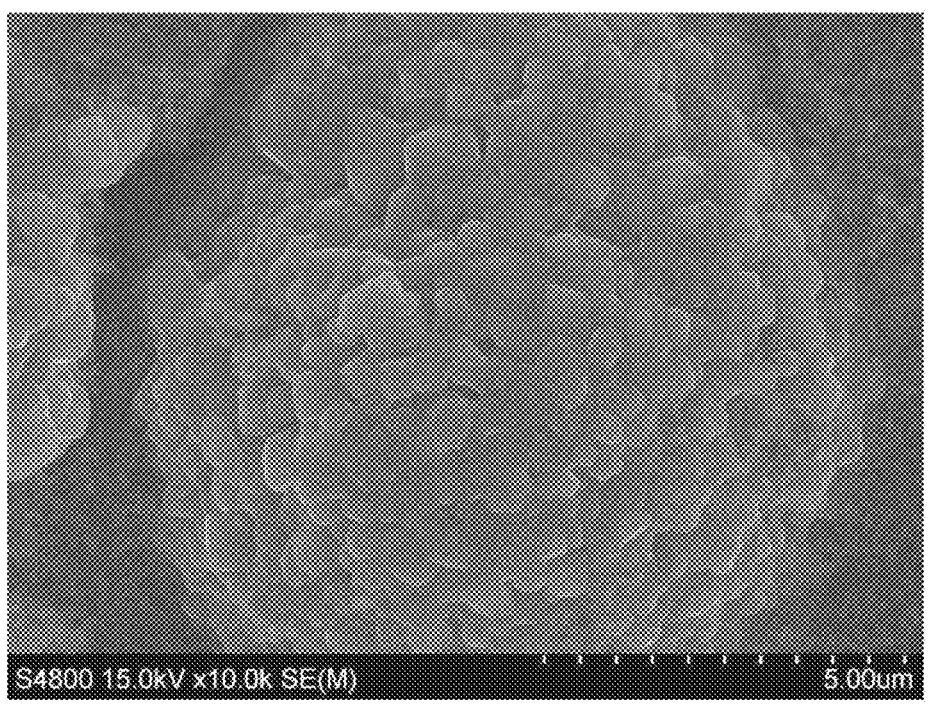
FIG. 3 shows SEM images of the surface of a positive electrode formed by adding carbon nanotube.
Figure 3:
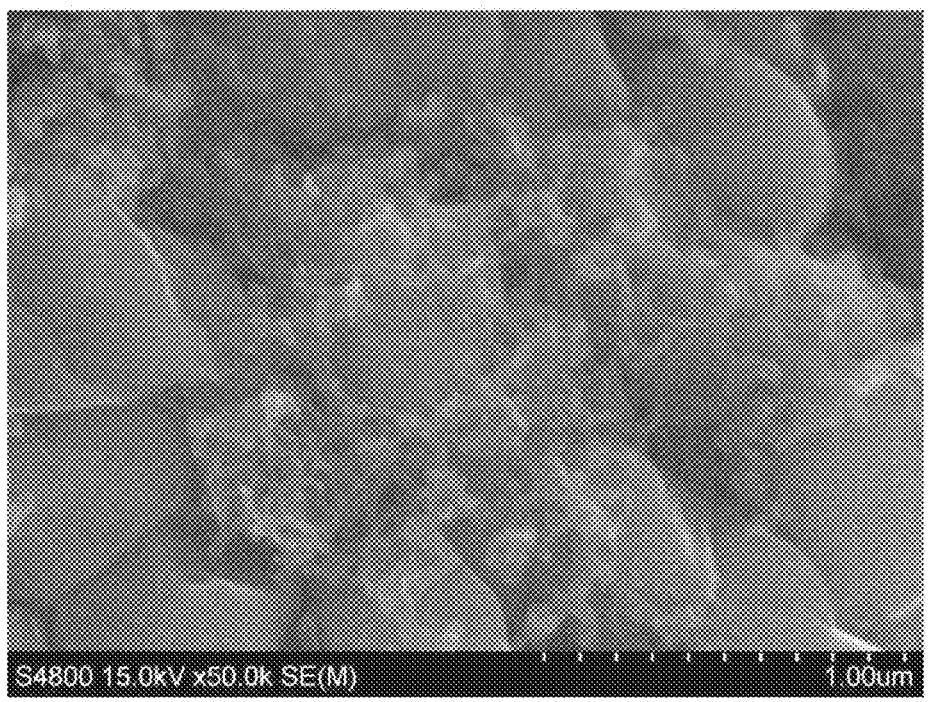

A test cell was prepared in the same manner as in Comparative Example 3 except that the positive electrode obtained above was used. The SEM images of the surface of the positive electrode are shown in FIG. 3.

Example 4

A test cell was prepared in the same manner as in Example 3 except that the mixing ratio of NCM111, PVdF, carbon black and CNT was set to be 84:4:7:5 and the mass load was set to be 126 g/m².

Comparative Example 5

A test cell was prepared in the same manner as in Comparative Example 1 except that the mass load of the positive electrode active material layer was set to be 170 g/m².

Example 5

A slurry containing NCM111, PVdF, carbon black and PG of Production Example 1 in a mass ratio of 88:4:7:1 was prepared and applied to an Al foil of 15 μm in thickness so as to be a mass load of 172 g/m², to obtain a positive electrode. The density of the positive electrode active material layer was controlled to be 2.8 g/cm³.

A test cell was prepared in the same manner as in Example 1 except that the positive electrode obtained above was used.

Example 6

A test cell was prepared in the same manner as in Example 3 except that the mass load of the positive electrode active material layer was set to be 175 g/m².

Comparative Example 6

A test cell was prepared in the same manner as in Comparative Example 1 except that the mass load of the positive electrode active material layer was set to be 190 g/m².

Example 7

A slurry containing NCM111, PVdF, carbon black and PG of Production Example 1 in a mass ratio of 88:4:7:1 was prepared and applied to an Al foil of 15 μm in thickness so as to be a mass load of 192 g/m², to obtain a positive electrode. The density of the positive electrode active material layer was controlled to be 2.8 g/cm³.

A test cell was prepared in the same manner as in Example 1 except that the positive electrode obtained above was used.

Example 8

A test cell was prepared in the same manner as in Example 3 except that the mass load of the positive electrode active material layer was set to be 196 g/m².

Evaluation of Charge-Rate Characteristics

The cells above were charged at a constant current of 0.1 C up to 4.2 V at 20° C. and discharged at a constant current of 0.1 C up to 2.5 V. Subsequently, the cells were charged at a constant current of 6 C up to 4.2 V and discharged at a constant current of 0.1 C up to 2.5 V. The ratio of the 6 C charging capacity and the 0.1 C charging capacity thus obtained (6 C/0.1 C charging capacity: (%)) was obtained as a charge-rate characteristic. Similarly, 10 C/0.1 C charging capacity: (%) was obtained.

The results are shown in Table 1, together with each energy density of the cells.

TABLE 1

| | Positive Electrode | | Mass load (g/m²) | Electrolyte solution | | | Charge rate capability (%) | | Energy density (Wh/kg) |
|---|---|---|---|---|---|---|---|---|---|
| | Active material (wt %) | Additive (wt %) | | Electrolyte (mol/l) | Solvent (Vol. ratio) | Additive (wt %) | 6 C/0.1 C | 10 C/0.1 C | |
| Comparative Example 1 | NCM111 (89) | None | 120 | LiPF$_6$ (1) | EC/DEC (3/7) | None | 71 | 61 | 160 |
| Comparative Example 2 | NCM111 (89) | None | 120 | LiPF$_6$ (0.65) LiFSI (0.65) | EC/DMC/EMC (2/4/4) | None | 76 | 68 | 160 |
| Comparative Example 3 | NCM111 (89) | None | 120 | LiPF$_6$ (0.65) LiFSI (0.65) | EC/DMC/EMC (2/4/4) | LiPO$_2$F$_2$ (1) | | | 160 |
| Comparative Example 4 | NCM111 (86) | VGCF (3) | 123.6 | LiPF$_6$ (0.65) LiFSI (0.65) | EC/DMC/EMC (2/4/4) | LiPO$_2$F$_2$ (1) | 78 | 63 | 160 |
| Example 1 | NCM111 (88.5) | PG (0.5) | 121 | LiPF$_6$ (0.65) LiFSI (0.65) | EC/DMC/EMC (2/4/4) | LiPO$_2$F$_2$ (1) | 80 | 70 | 160 |
| Example 2 | NCM111 (86) | PG (3) | 123.6 | LiPF$_6$ (0.65) LiFSI (0.65) | EC/DMC/EMC (2/4/4) | LiPO$_2$F$_2$ (1) | 84 | 72 | 160 |
| Example 3 | NCM111 (86) | CNT (3) | 123.6 | LiPF$_6$ (0.65) LiFSI (0.65) | EC/DMC/EMC (2/4/4) | LiPO$_2$F$_2$ (1) | 87 | 80 | 160 |
| Example 4 | NCM111 (84) | CNT (5) | 126 | LiPF$_6$ (0.65) LiFSI (0.65) | EC/DMC/EMC (2/4/4) | LiPO$_2$F$_2$ (1) | 88 | 80 | 160 |
| Comparative Example 5 | NCM111 (89) | None | 170 | LiPF$_6$ (1) | EC/DEC (3/7) | None | 67 | 45 | 180 |
| Example 5 | NCM111 (88) | PG (1) | 172 | LiPF$_6$ (0.65) LiFSI (0.65) | EC/DMC/EMC (2/4/4) | LiPO$_2$F$_2$ (1) | 72 | 55 | 180 |
| Example 6 | NCM111 (86) | CNT (3) | 175 | LiPF$_6$ (0.65) LiFSI (0.65) | EC/DMC/EMC (2/4/4) | LiPO$_2$F$_2$ (1) | 73 | 58 | 180 |
| Comparative Example 6 | NCM111 (89) | None | 190 | LiPF$_6$ (1) | EC/DEC (3/7) | None | 54 | 32 | 200 |
| Example 7 | NCM111 (88) | PG (1) | 192 | LiPF$_6$ (0.65) LiFSI (0.65) | EC/DMC/EMC (2/4/4) | LiPO$_2$F$_2$ (1) | 62 | 45 | 200 |
| Example 8 | NCM111 (86) | CNT (3) | 196 | LiPF$_6$ (0.65) LiFSI (0.65) | EC/DMC/EMC (2/4/4) | LiPO$_2$F$_2$ (1) | 62 | 46 | 200 |

In Examples 1 to 8 where a positive electrode active material was coated with porous graphene or carbon nanotube and an electrolyte solution containing 0.5 mold of LiFSI, a ternary-system of solvents of EC/DMC/EMC and LiPO$_2$F$_2$ were added, compared to Comparative Examples outside the range of the present invention, it was confirmed that charge-rate characteristics are improved even at the same energy density. Particularly, remarkable effects were confirmed at high energy densities. Compared to Comparative Example 3 where an electrolyte solution containing 0.5 mold of LiFSI, a ternary-system of solvents of EC/DMC/EMC and LiPO$_2$F$_2$ were added, and Comparative Example 4 where VGCF, which is nano-carbon having no lithium ion path, was added, it was confirmed that use of porous graphene or carbon nanotube having a lithium ion path is more effective.

While the invention has been particularly shown and described with reference to example embodiments thereof, the invention is not limited to these embodiments and Examples. It will be understood by those of ordinary skill in the art that various changes in form and details may be made therein without departing from the spirit and scope of the present invention as defined by the claims.

The application is based upon and claims the benefit of priority from Japanese Patent Application No. 2016-117205 filed on Jun. 13, 2016, the disclosure of which is incorporated herein in its entirety by reference.

The invention claimed is:
1. A lithium ion secondary battery comprising:
   a positive electrode comprising a positive electrode active material made of a lithium composite oxide, and nano-carbon having a Li ion diffusion path as an additive, and an electrolyte solution comprising 0.5 mol/l or more of Li[(FSO$_2$)$_2$N] as an electrolyte, LiPO2F2 as an additive, and a ternary-system of ethylene carbonate (EC), dimethyl carbonate (DMC) and ethyl methyl carbonate (EMC), as solvents;

wherein the nano-carbon comprises porous graphene and satisfies the following conditions:

(1) The porous graphene has 1 to 200 graphene layers,
(2) The sizes of pores in a graphene basal plane range from 70 nm to 200 nm,
(3) The number of pores in each graphene basal plane is 10 to 500 per μm$^2$,
(4) Oxygen content is 0.8 mass % or less,
(5) In Raman spectroscopy, the peak intensity-ratio $I_D/I_G$, which is the ratio of the peak in G band present within the range of 1596 to 1570 cm$^{-1}$ to the peak in D band near 1360 cm$^{-1}$, is 0.6 to 1.35, and
(6) Pore volumes fall within the range of 1.35 to 3 cm$^3$/g.

2. The lithium ion secondary battery according to claim 1, wherein the nano-carbon coats a surface of the positive electrode active material in the positive electrode.

3. The lithium ion secondary battery according to claim 1, wherein the electrolyte contains Li[(FSO$_2$)$_2$N] and other electrolyte, and the molar ratio of Li[(FSO$_2$)$_2$N] to the other electrolyte is 1 or more.

4. The lithium ion secondary battery according to claim 3, wherein the other electrolyte is LiPF$_6$.

5. The lithium ion secondary battery according to claim 3, wherein a total concentration of the electrolytes in the electrolyte solution is 0.6 to 2 mol/L.

6. The lithium ion secondary battery according to claim 1, wherein the LiPO$_2$F$_2$ is contained in an amount of 0.005 to 7 mass % in the electrolyte solution.

7. The lithium ion secondary battery according to claim 1, wherein the ternary-system of solvents are contained in a volume ratio represented by the following expression (1):

$$EC/DMC/EMC = x:y:1-x-y \qquad (1)$$

wherein x is 0.15 to 0.5; y is 0.2 to 0.6; and x+y<1.

8. The lithium ion secondary battery according to claim 1, wherein the lithium composite oxide is a material having a layered structure.

9. The lithium ion secondary battery according to claim 8, wherein the material having a layered structure is a lithium-cobalt-nickel-manganese composite oxide.

* * * * *